(12) United States Patent
Lippey et al.

(10) Patent No.: US 8,687,272 B1
(45) Date of Patent: Apr. 1, 2014

(54) LOW-SPECKLE PROJECTION SCREEN

(71) Applicant: Laser Light Engines, Inc., Salem, NH (US)

(72) Inventors: Barret Lippey, Belmont, MA (US); Ian Turner, Stratham, MA (US)

(73) Assignee: Laser Light Engines, Inc., Salem, NH (US)

( * ) Notice: Subject to any disclaimer, the term of this patent is extended or adjusted under 35 U.S.C. 154(b) by 0 days.

(21) Appl. No.: 13/866,661

(22) Filed: Apr. 19, 2013

(51) Int. Cl.
*G03B 21/60* (2006.01)

(52) U.S. Cl.
USPC .......................................... 359/452; 359/459

(58) Field of Classification Search
CPC ....................................................... G03B 21/56
USPC ........................................ 359/452, 449, 459
See application file for complete search history.

(56) References Cited

U.S. PATENT DOCUMENTS

| | | | | |
|---|---|---|---|---|
| 2,906,169 A * | 9/1959 | Saffir | ............................ | 359/451 |
| 3,893,748 A * | 7/1975 | De Palma et al. | ............. | 359/455 |
| 5,361,163 A * | 11/1994 | Matsuda et al. | ............... | 359/452 |
| 6,144,491 A * | 11/2000 | Orikasa et al. | ................ | 359/452 |
| 6,404,548 B1 * | 6/2002 | Tatsuki et al. | ................. | 359/449 |
| 7,408,707 B2 * | 8/2008 | Yeo et al. | ....................... | 359/452 |
| 7,911,692 B2 * | 3/2011 | Okamoto | ....................... | 359/449 |
| 2004/0233524 A1 * | 11/2004 | Lippey et al. | ................. | 359/443 |
| 2006/0056021 A1 * | 3/2006 | Yeo et al. | ....................... | 359/460 |
| 2010/0259818 A1 * | 10/2010 | Mikoshiba | ..................... | 359/459 |

* cited by examiner

*Primary Examiner* — Christopher Mahoney
(74) *Attorney, Agent, or Firm* — Barret Lippey

(57) ABSTRACT

A projection screen that reduces speckle by separating reflective flakes by at least 100 micrometers. The reflective flakes are held in a binder material that is coated on a backing layer. In a laser projection system, the separation distance between reflective flakes may be at least twice the coherence length of the laser light.

10 Claims, 3 Drawing Sheets

LOW-SPECKLE PROJECTION SCREEN

BACKGROUND OF THE INVENTION

Laser projectors may create visually undesirable speckle artifacts. High-gain front-projection screens tend to exacerbate the problem. Even despeckling methods that are effective on low-gain screens, may not be sufficient to despeckle acceptably on high-gain screens.

DETAILED DESCRIPTION

Figure 1:
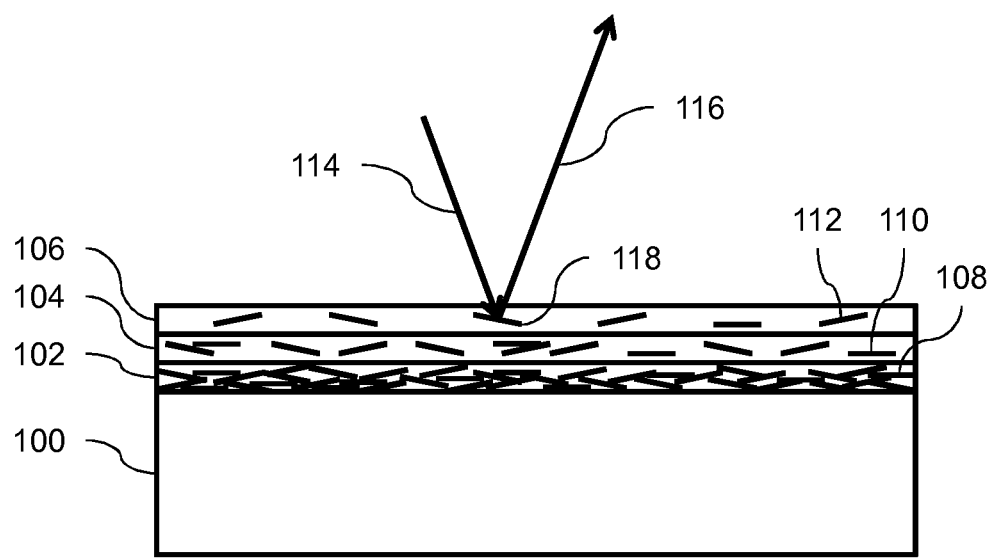
FIG. 1 is a cross-sectional view of a multi-layer low-speckle projection screen.

Laser front projectors may create visually undesirable speckle artifacts. Speckle is an interference effect that appears as tiny bright and dark spots in the visual image. Although angle diversity is one of the a primary determinants of the speckle level, the severity of the speckle also depends on the temporal coherence length of the laser light as compared to the interaction length between the projected light and the screen. For a fixed angle diversity, polarization diversity, and wavelength diversity, the projection screen construction is the primary remaining variable that can be engineered to reduce speckle.

Front projection screens can be divided into low gain screens and high gain screens. Screen gain is defined as the reflection of a screen divided by the reflection of a perfect Lambertian reflector with the same projected in light in both cases. Screen gain is a function of absorption and geometric guiding. Low absorption and high geometric guiding tend to make high screen gain. Low gain screens, are usually constructed from white plastic material that have bulk scatter such as white vinyl, or white-paint coatings. Low gain screens typically have gain in the range of 0.5 to 1.5. High gain screens are used to increase the brightness of the reflected image and are usually constructed from reflective flakes that geometrically guide the light into a central cone.

Reflective flakes may be formed from a white material, such as mica, that is not polarization preserving, thereby making a white high-gain screen that cannot be used with polarization-based 3D projection, or the flakes may be formed from a metallic reflective material, such as aluminum, in which case the screen is a silver high-gain screen that is polarization preserving and can be used with polarization-based 3D projection. High gain screens typically have gain in the range of 1.5 to 3.0. The flakes are typically held in position by a binder material. The binder material may be any transparent coating material such as a clear paint base or lacquer. The deposition of the binder with reflective flakes is typically a wet process that cures into a solid layer. The deposition process may be a spray process, gravure process, or any other process that can manufacture a thin, uniform film. In the case of polarization preserving screens, the cured binder material should have low birefringence so as not to affect the polarization of light passing through the binder. The binder material is typically coated onto a backing material that physically supports the binder material to form a thin sheet that can be stretched flat and hung as a projection screen. The backing material may be a thin plastic sheet. Slightly stretchable plastic and binder materials provide an advantage when building wrinkle-free projection screens that cover large areas.

In order to prevent glare or a localized hotspot from a front projection screen, the front surface of the screen must be rough enough to avoid a specular reflection of the projected beam. The required root mean square (rms) roughness is significantly more than the wavelength of visible light, which is approximately 0.5 microns. Even with a rough screen, high gain screens will tend to have a hotspot which is located around the area that forms a specular reflection angle between the projector and the viewer, and the desirable high brightness from the high gain is obtained only at viewing angles close to the hotspot. Elsewhere on the screen, away from the hotspot, the brightness is lower and may, in fact, be much lower than a typical low gain screen. For high gain front projection screens, visible speckle is function of projection angle and viewing angle. At or near the hotspot, speckle will tend to be more visible. Evaluation of speckle should take these angle effects into account to obtain repeatable measurements.

In three-color projection systems, separate speckle levels can be seen for red, green, and blue colors. Green speckle tends to dominate in many systems because of the high photopic sensitivity and acuity of the human eye in the green region of the spectrum. Blue speckle tends to be invisible to the human eye because of the particularly low photopic sensitivity and acuity in blue. The visual appearance of red speckle tends to be somewhere between blue and green speckle. For three color systems, speckle for white light and other colors is related to the combination of the constituent red, green, and blue speckle levels depending on the amount of each constituent color.

Temporal coherence is a property of light that determines the length over which the light can exhibit interference effects such as speckle. Coherence length can be calculated for each color of a laser projector from the central wavelength and bandwidth of that color. The formula for coherence length is $L=c/(\pi * \Delta f)$ where L is the coherence length in meters, c is the speed of light in meters/second, and $\Delta f$ is spectral width in Hertz. Also, wavelength can be calculated from frequency using the formula, $f=c/\lambda$, where $\lambda$ is the wavelength in meters, c is the speed of light in meters/second, and f is the frequency in Hertz. Using these formulas, it can be calculated that for green light (a wavelength in the range of about 500 to about 600 nm), a bandwidth of 0.1 nm corresponds to a coherence length of about 1000 microns, a bandwidth of 1 nm corresponds to a coherence length of about 100 microns, a bandwidth of 10 nm corresponds to a coherence length of about 10 microns, and a bandwidth of 50 nm corresponds to a coherence length of about 2 microns.

The above bandwidths represent typical values for various types of green light sources. For example, a bandwidth of 0.1 nm is typical of frequency-doubled diode-pumped solid-state (DPSS) lasers. A bandwidth of 1 nm is typical of direct laser diodes. A bandwidth of 10 nm is typical of frequency-broadened DPSS lasers. And a bandwidth of 50 nm is typical of broad-spectrum filtered white-light sources such as xenon arc lamps. Similar calculations can be performed for various types of blue and red light sources. Considering all possible colors and combination of colors in a multi-color system, there is a characteristic maximum coherence length that results in maximum visible speckle for a specific system. As long as the speckle is tolerable for the characteristic maximum coherence length, the visible speckle for the other colors will also be tolerable.

The interaction length of the light source with the projection screen depends on factors such as the roughness of the screen and how deeply the light penetrates into the material. For screens that consist of thin layers of paint or reflective flakes, such as high-gain screens, the interaction length is typically determined mainly by the roughness. For screens that consist of bulk diffusers such as vinyl plastic sheet, the interaction length is determined mainly by the penetration depth into the material. Maximum interaction length is desirable to reduce the effects of speckle. If the interaction length is larger than the coherence length, the speckle can be reduced to relatively low levels. With other variables being fixed, the largest possible ratio of interaction length to coherence length will make the lowest possible speckle. Optimally, the ratio of interaction length to coherence length should be greater than 10, although a ratio greater than 2 may still reduce speckle sufficiently for some applications.

For semiconductor or frequency-broadened green lasers, the separation between flakes in the direction perpendicular to the binding material (and backing layer) should be on the order of 100 micrometers or more. More than 500 micrometers will result in even lower speckle, but the binder may become too thick or too costly for some applications.

The density of reflective flakes may be equal throughout the thickness of the binder layer or layers, but it is advantageous to vary the density of flakes so that a high density of flakes exists near the back of the screen (near the backing layer) and a lower density of flakes exists near the front of the screen (away from the backing layer). This variation in flake density allows the incoming light rays to be reflected evenly throughout the thickness of the screen because less light penetrates to the back of the screen, therefore the reflectivity near the back of the screen (determined by the density of flakes) must be higher than the reflectivity at the front of the screen.

FIG. 1 shows a cross-sectional view of a multi-layer low-speckle projection screen. Backing layer 100 acts as a structural support for the projection screen assembly. First binder layer 102 is deposited on backing layer 100. First binder layer 102 holds first reflective flake 108. Second binder layer 104 is deposited on first binder layer 102. Second binder layer 104 holds second reflective flake 110. Third binder layer 106 is deposited on second binder layer 104. Third binder layer 106 holds third reflective flake 112 and fourth reflective flake 118. First binder layer 102 may hold a higher density of reflective flakes than second binder layer 104. Second binder layer 104 may hold a higher density of reflective flakes than third binder layer 106. Incoming light ray 114 reflects from fourth reflective flake 118 to form reflected light ray 116. Incoming light ray 114 may be generated from a laser front projector. Reflected light ray 116 may be seen by viewers. Other reflective flakes are also shown that can make other reflected light rays (not shown) at various angles to form a complete visual image for viewers.

Figure 2:
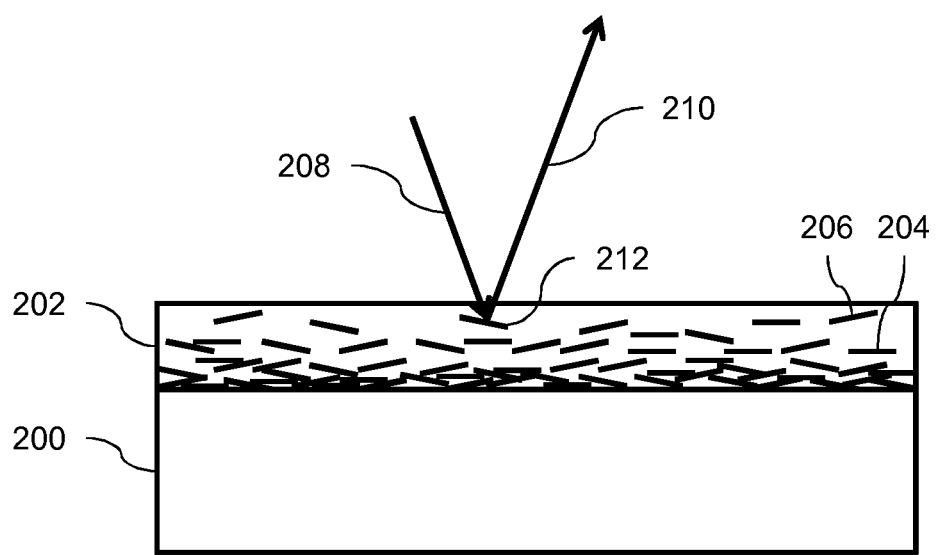
FIG. 2 is a cross-sectional view of a variant-density low-speckle projection screen.

FIG. 2 shows a cross-sectional view of a variant-density low-speckle projection screen. Backing layer 200 acts as a structural support for the projection screen assembly. Binder layer 202 is deposited on backing layer 200. Binder layer 202 holds first reflective flake 204, second reflective flake 206, and third reflective flake 212. Binder layer 202 holds a higher density of reflective flakes close to backing layer 200 and a lower density of reflective flakes far from backing layer 200. Incoming light ray 208 reflects from third reflective flake 212 to form reflected light ray 210. Incoming light ray 208 may be generated from a laser front projector. Reflected light ray 210 may be seen by viewers. Other reflective flakes are also shown that can make other reflected light rays (not shown) at various angles to form a complete visual image for viewers.

Figure 3:
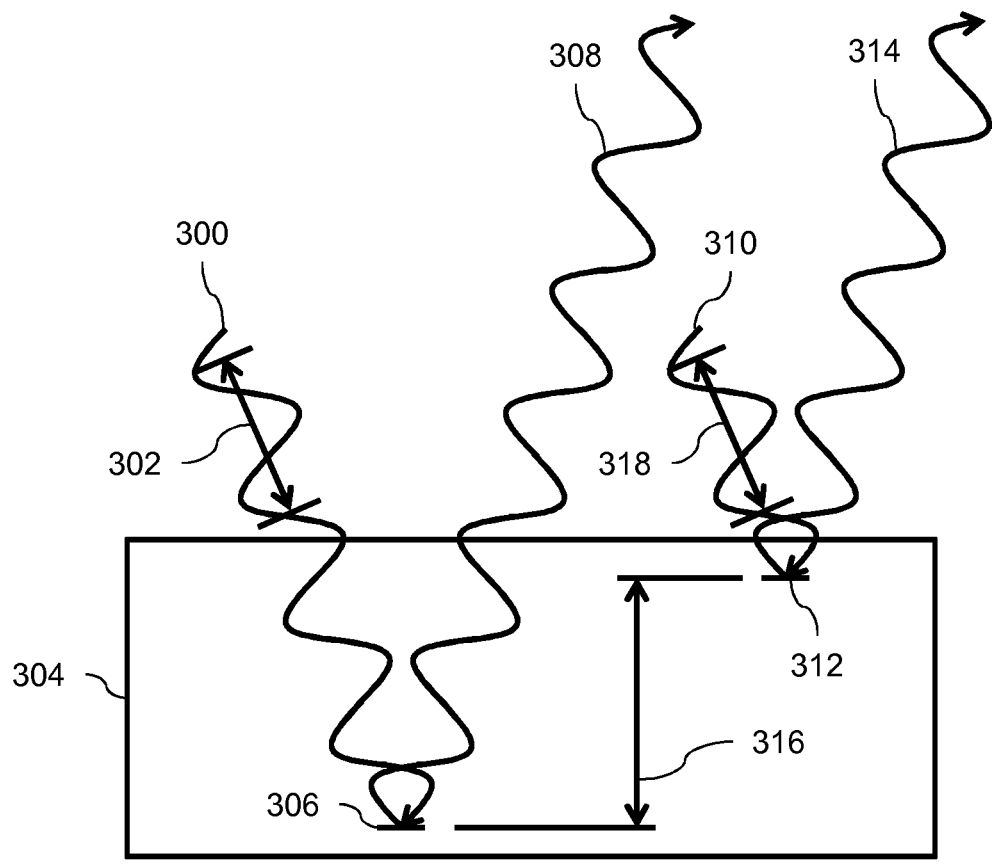
FIG. 3 is a cross-sectional view of inference effects in a low-speckle projection screen.

FIG. 3 shows a cross-sectional view of inference effects in a low-speckle projection screen. Binder layer 304 holds first reflective flake 306 and second reflective flake 312. First incoming light ray 300 has coherence length 302 and reflects from first reflective flake 306 to form first reflected light ray 308. Second incoming light ray 310 has coherence length 318 and reflects from second reflective flake 312 to form second reflected light ray 314. First reflective flake 306 is separated from second reflective flake 312 by separation distance 316 which is defined perpendicular to binder layer 304. Separation distance 316 is larger than coherence length 302 and coherence length 318. First reflective flake 306 and second reflective flake 312 are examples of many reflective flakes that may be dispersed throughout binder layer 304.

Other implementations are also within the scope of the following claims.

What is claimed is:

1. A projection screen comprising:
    a first reflective flake;
    a second reflective flake;
    a layer of binder material that holds the first reflective flake and the second reflective flake; and
    a backing layer;
    wherein the first reflective flake is separated from the second reflective flake by at least 100 micrometers perpendicular to the layer of binder material; and the backing layer supports the layer of binder material.

2. The projection screen of claim 1 wherein the first reflective flake is separated from the second reflective flake by at least 500 micrometers perpendicular to the layer of binder material.

3. The projection screen of claim 1 further comprising:
    a first layer of reflective flakes that comprises the first reflective flake; and
    a second layer of reflective flakes that comprises the second reflective flake;
    wherein the first layer of reflective flakes is separated from the second layer of reflective flakes by at least 100 micrometers perpendicular to the layer of binder material.

4. The projection screen of claim 3 wherein the first layer of reflective flakes is separated from the second layer of reflective flakes by at least 500 micrometers perpendicular to the layer of binder material.

5. A projection screen comprising:
    a layer of binder material holding reflective flakes; and
    a backing layer;
    wherein the layer of binder material holding flakes has a density of reflective flakes near the backing layer and a density of reflective flakes away from the backing layer; the density of reflective flakes near the backing layer is higher than the density of reflective flakes far from the backing layer; and the backing layer supports the layer of binder material holding reflective flakes.

6. The projection screen of claim 5 wherein the layer of reflective flakes has a thickness of at least 100 micrometers.

7. The projection screen of claim 5 wherein the layer of reflective flakes has a thickness of at least 500 micrometers.

8. A projection system comprising;
    a laser projector that emits light having a characteristic maximum coherence length; and
    a projection screen;
    wherein the projection screen comprises a first reflective flake and a second reflective flake; the first reflective flake and the second reflective flake being separated by a separation distance perpendicular to the projection screen; and the separation distance perpendicular to the projection screen being larger than the characteristic maximum coherence length.

9. The projection system of claim 8 wherein a ratio of separation distance perpendicular to the projection screen and the characteristic maximum coherence length is larger than 2.

10. The projection system of claim 9 wherein the ratio of separation distance perpendicular to the projection screen and the characteristic maximum coherence length is larger than 10.

\* \* \* \* \*